T. GARE.
MACHINE FOR REDUCING VULCANIZED RUBBER TO POWDER.
APPLICATION FILED APR. 13, 1908.
1,050,122. Patented Jan. 14, 1913.
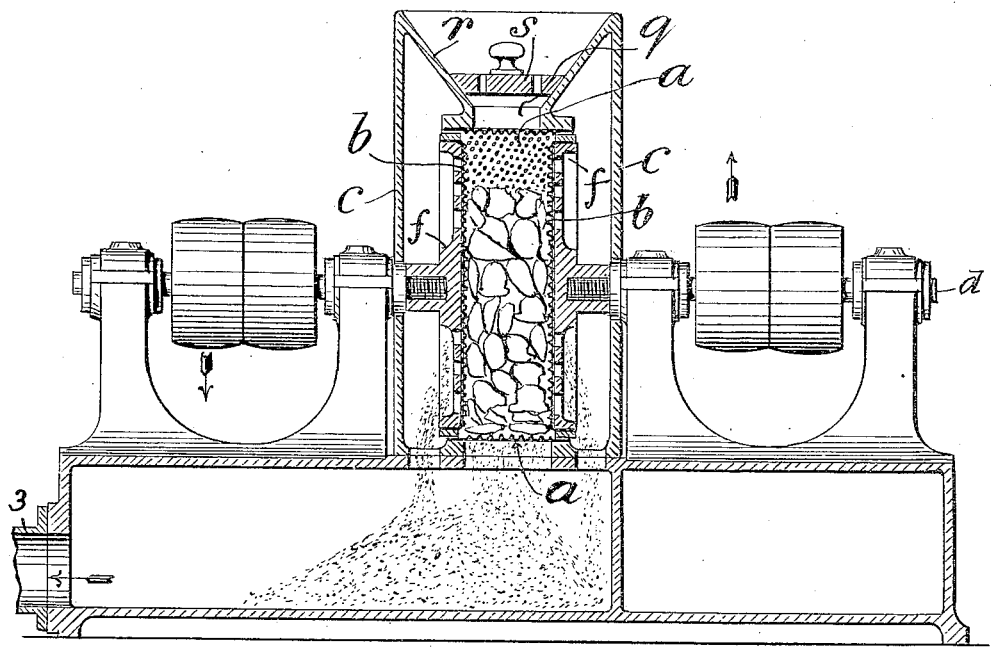
Witnesses
Alfred Bosshardt
Stanley Bramall
Inventor,
Thomas Gare
Per J. Bosshardt,
Attorney

UNITED STATES PATENT OFFICE.

THOMAS GARE, OF NEW BRIGHTON, ENGLAND.

MACHINE FOR REDUCING VULCANIZED RUBBER TO POWDER.

1,050,122.  Specification of Letters Patent.  Patented Jan. 14, 1913.

Application filed April 13, 1908. Serial No. 426,895.

*To all whom it may concern:*

Be it known that I, THOMAS GARE, a subject of Great Britain, residing at New Brighton, in the county of Chester, Kingdom of Great Britain, have invented new and useful Improvements in Machines for Reducing Vulcanized Rubber to Powder, of which the following is a specification.

Hitherto vulcanized india rubber, say waste india rubber, has been reduced to powder by grinding, by such as a pair of plain or grooved rollers running at different speeds and such rollers required a great amount of power to drive. These rollers do also not permit of grinding the rubber to a very fine powder as is of advantage and required for some purposes, the friction created is liable to burn and thus deteriorate the rubber and pieces of metal generally found among old waste rubber are also liable to damage the said rollers or cause the machine to break.

My invention has for its object to provide means whereby the said defects are entirely overcome.

My improved machine consists chiefly of a casing inside of which is a receptacle for the rubber to be ground. The said receptacle is composed of a horizontal stationary cylinder and a perforated disk in each end thereof which disks are each secured to a shaft suitably mounted and rotated in opposite directions. The said cylinder is formed of and the said disks faced with perforated material having inwardly projecting rasp or grater like prominences, the rubber pieces being placed loosely into the receptacle and allowed to roll about and continuously change their position which together with the air which enters the interior of the receptacle through the said perforations keeps the rubber pieces and the said prominences cool and thereby prevents them from being burned and preserving completely the elastic property of the rubber.

I attain this object by the means illustrated in the accompanying one sheet of drawing, which shows a vertical section of a machine constructed in accordance with my invention.

Referring to the drawing, $a$ is the said cylinder which has perforations and rasp or grater like prominences and is secured in a horizontal plane inside the casing $c$. $f$ are perforated disks, one of which is employed in each end of the cylinder $a$ and on its inner side faced with a disk $b$ having perforations and rasp or grater like prominences.

The disks $f$ are each secured to the end of a horizontal shaft $d$ suitably mounted in bearings and furnished with pulleys whereby they are rotated in opposite directions inside the cylinder $a$. The latter has at the top an inlet $q$ in connection with a hopper or inlet $r$ on the casing $c$ which permits of charging the receptacle having perforations and rasp or grater like prominences with pieces of india rubber. The casing $c$ may be provided with a lid $s$ to prevent the ground rubber from flying out and a chamber $a'$ is provided below the receptacle $a$ to receive the ground rubber. The well of the casing $c$ may be a pipe 3 be connected with an exhaust fan (not shown) which draws away the ground rubber and at the same time keeps the prominences of the said cylinder and disks cool and hence cause the same to remain sharp much longer. By preference the said disks and cylinder are formed of stabbed steel having either triangular or round prominences obviously facing the rubber to be ground.

I claim:

1. In a machine for reducing vulcanized rubber to powder, a casing and a receptacle having an air space between them, the said receptacle comprising a horizontal stationary cylinder and a perforated rotary disk in each end thereof and the said cylinder being formed of and the said disks faced with perforated material having inwardly projecting prominences and means for rotating the said disks in opposite directions, all combined substantially as and for the purpose set forth.

2. In a machine for reducing vulcanized rubber to powder, a casing and a receptacle having an air space between them and the said casing and receptacle being each provided with an inlet in register with each other, the said receptacle comprising a horizontal stationary cylinder and a perforated rotary disk in each end thereof and the said cylinder being formed of and the said disks faced with perforated material having inwardly projecting prominences, a chamber below the said casing in communication with the said air space and the interior of the said cylinder and means for rotating the said disks in opposite directions, all combined substantially as and for the purpose set forth.

In testimony whereof I have signed my name to this specification in the presence of two subscribing witnesses.

THOMAS GARE.

Witnesses:
 ALFRED BOSSHARDT,
 STANLEY E. BRASNALL.

Copies of this patent may be obtained for five cents each, by addressing the "Commissioner of Patents, Washington, D. C."